March 12, 1957  H. H. GORRIE  2,785,037
INSTRUMENT CASE
Filed Sept. 12, 1952  5 Sheets-Sheet 1

INVENTOR.
HARVARD H. GORRIE
BY
Raymond W. Junkins
ATTORNEY

INVENTOR.
HARVARD H. GORRIE

March 12, 1957  H. H. GORRIE  2,785,037
INSTRUMENT CASE

Filed Sept. 12, 1952  5 Sheets-Sheet 4

INVENTOR.
HARVARD H. GORRIE
BY
Raymond W. Junkins
ATTORNEY

March 12, 1957

H. H. GORRIE 2,785,037

INSTRUMENT CASE

Filed Sept. 12, 1952

INVENTOR.
HARVARD H. GORRIE
BY
Raymond D. Junkins
ATTORNEY

United States Patent Office 2,785,037
Patented Mar. 12, 1957

2,785,037

INSTRUMENT CASE

Harvard H. Gorrie, Cleveland Heights, Ohio, assignor to Bailey Meter Company, Cleveland Heights, Ohio, a corporation of Delaware Application September 12, 1952, Serial No. 309,341

9 Claims. (Cl. 346—17)

This invention relates to instrument case construction which provides a multiplicity of possible arrangements for instrument units carried within, and on, the case.

The instrument industry, generally, has been under continuous pressure to provide indicating, recording and controlling units of many types within a small, compact space for close, efficient attention. It is to the relief of this pressure, that the present invention is directed by provision for fluid actuated and electronic, or electric, actuated indicators and/or recorders to be selectively placed in positions within a single case enclosure. At each position, or station, within the case proper, means are provided for any one of a variety of responsive devices to function by positioning an indicator and/or recording pen over a common chart.

When placed in operative positions at their selected stations, the actuated devices are held in position by manually controlled fasteners. The devices may easily be removed, through manual termination of the control of the fasteners, for necessary adjustments, cleaning or replacement of the devices. Not only may the devices be removed from the case individually, but the conduits for the power to them may be removed and replaced independently of the devices.

The scope of the invention can be clearly discerned as including an industrial instrument case in which the stations are arranged for the alternative accommodation of a plurality of types of indicating and/or recording devices. The case then becomes a central point of concentration for many combinations of the devices responsive to as many different variables. It becomes possible, because of my invention, to rearrange the different types of devices, i. e., a fluid pressure device can be replaced by an electronic, or electric, device as well as the fluid pressure conduit by the electrical conduit conducting power to the device.

Integrating devices, in some instances, might appear to fall outside the class of indicating and/or recording devices contemplated removal or replacement in the novel case. However, with relation to my invention, integrators are considered as included among those devices supported by, and actuated within, the novel instrument case.

A general objective of my invention then becomes to supply a case structure for support of various combinations of electric and fluid pressure indicating and/or recording units.

Another object is to supply a case from which the electric and fluid pressure units are readily detachable and into which they are readily insertable.

Still another object is to supply a case in which specific positions are designated as instrument unit stations and to which either electrical or fluid pressure conduits may be detachably arranged for operative engagement with either type of indicating and/or recording units.

And finally, the present invention has as its object to supply a case in which each unit station is provided with either a fluid pressure plug or an electric terminal body with which fluid pressure and electric connections may be terminated and with which fluid pressure and electric actuated units may be detachably engaged.

Figure 1:
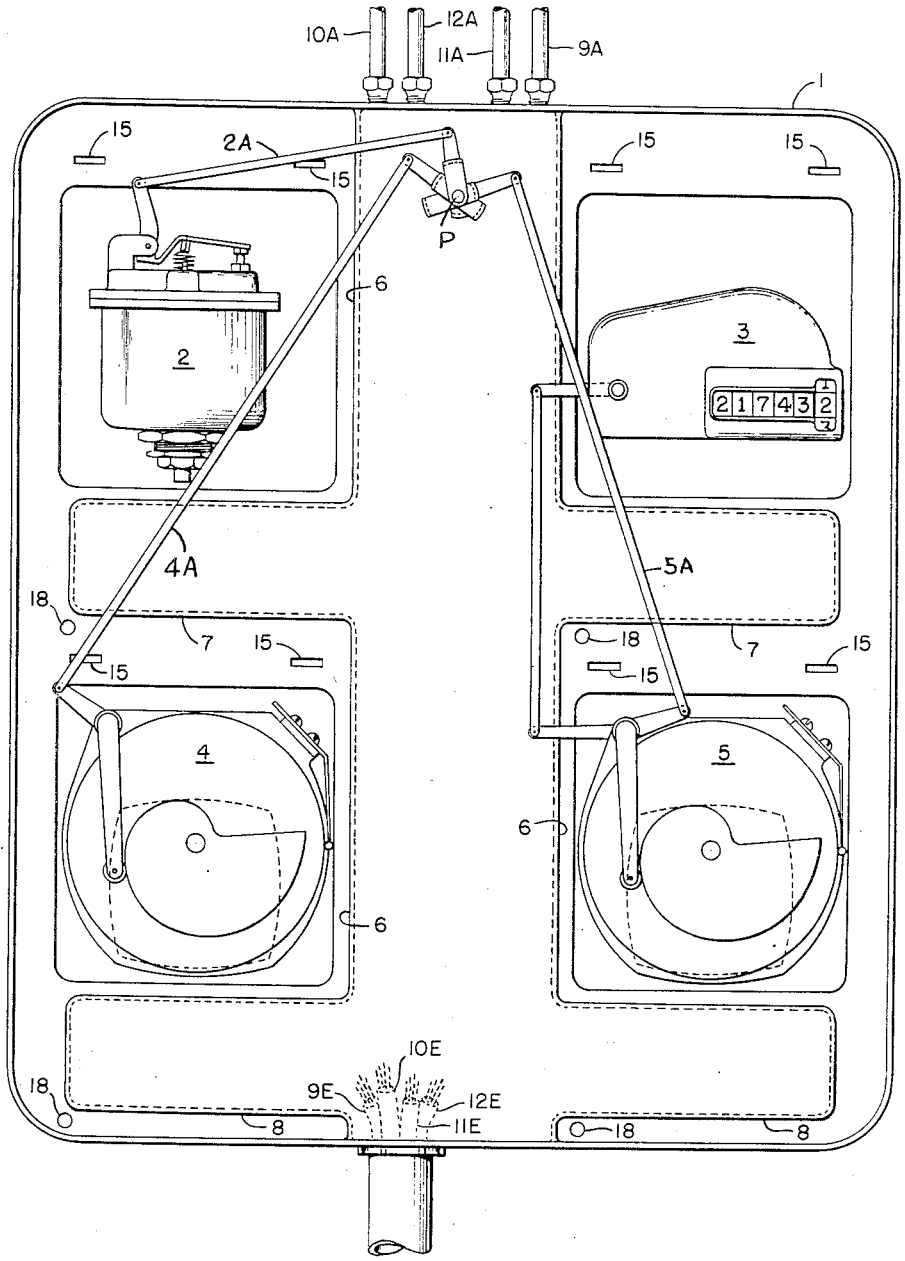
Fig. 1 shows the invention in a front elevation with the various types of units positioned operatively thereon.

In Fig. 1, I have shown the front of an instrument case 1 structure in which my invention is embodied. As no purpose would be served, the door to this case has not been illustrated nor has the means for supporting the charts upon which the permanent record is made.

I have placed, at the various stations provided on the back plate of the case, those electric and fluid pressure operated units 2, 3, 4 and 5 which are actuated to indicate and/or record variables, or integrate their magnitudes. Although I have shown four stations as the ordinarily desirable number, the invention is understood to be in no way limited thereto with respect to its minimum or maximum number of stations designated thereon. Nor, as I have said before, do integrator units fall outside the classes of instruments actuated and supported by my invention. In a broad sense, my invention can be regarded as a platform of unique structure for the support and protection of a wide variety of forms of telemetric receivers, or combination of receivers, which indicate and/or record the magnitudes, or integrated value of the magnitudes, of variables measured at remote points and expressed in some form of electrical or fluid pressure signal.

Figure 3:
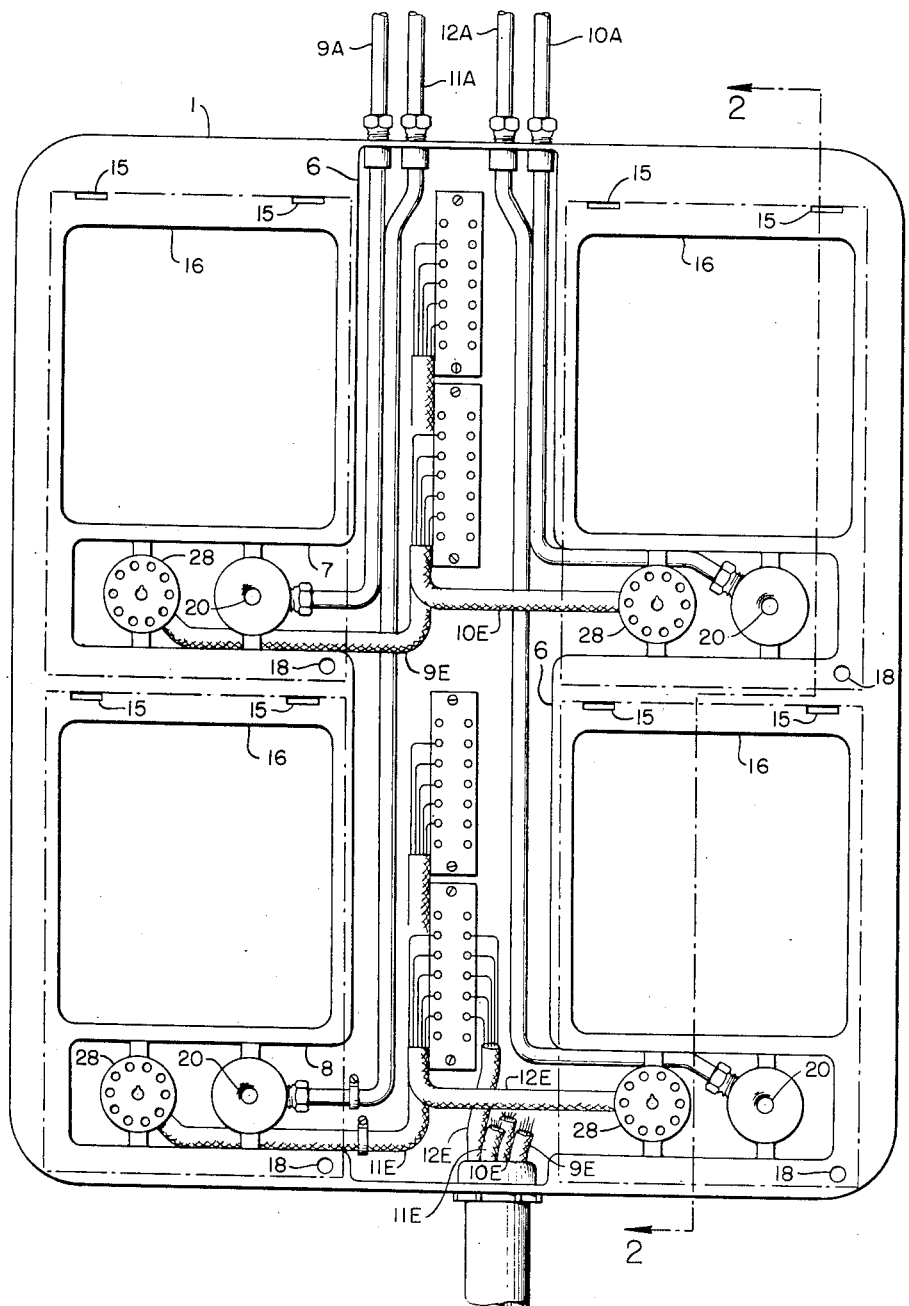
Fig. 3 is a rear elevation of one form of the invention illustrating the structure on which electric or fluid pressure units are removably attached.

The structure embodying an important part of the present invention is indicated at 6, 7 and 8 as respectively one vertical and two horizontal channels formed from, or attached to, the case back. These channels 6, 7 and 8 serve each of the units 2—5 by accommodating the electrical or fluid pressure conduits coming to the units from remote points of measurement. Generally, it is disclosed here that the pipes 9A, 10A, 11A, 12A and cables 9E, 10E, 11E, 12E enter the vertical channel 6 from its top and/or bottom and extend to the units along horizontal channels 7 and 8. The means for holding the elements 9A—12A and 9E—12E in the channels can be any simple form of bracket suited to the particular type of element accommodated, and the cables may go to a terminal block as shown in Fig. 3 or they may go directly to an electrical terminal body 28 at the stations.

Figure 2:
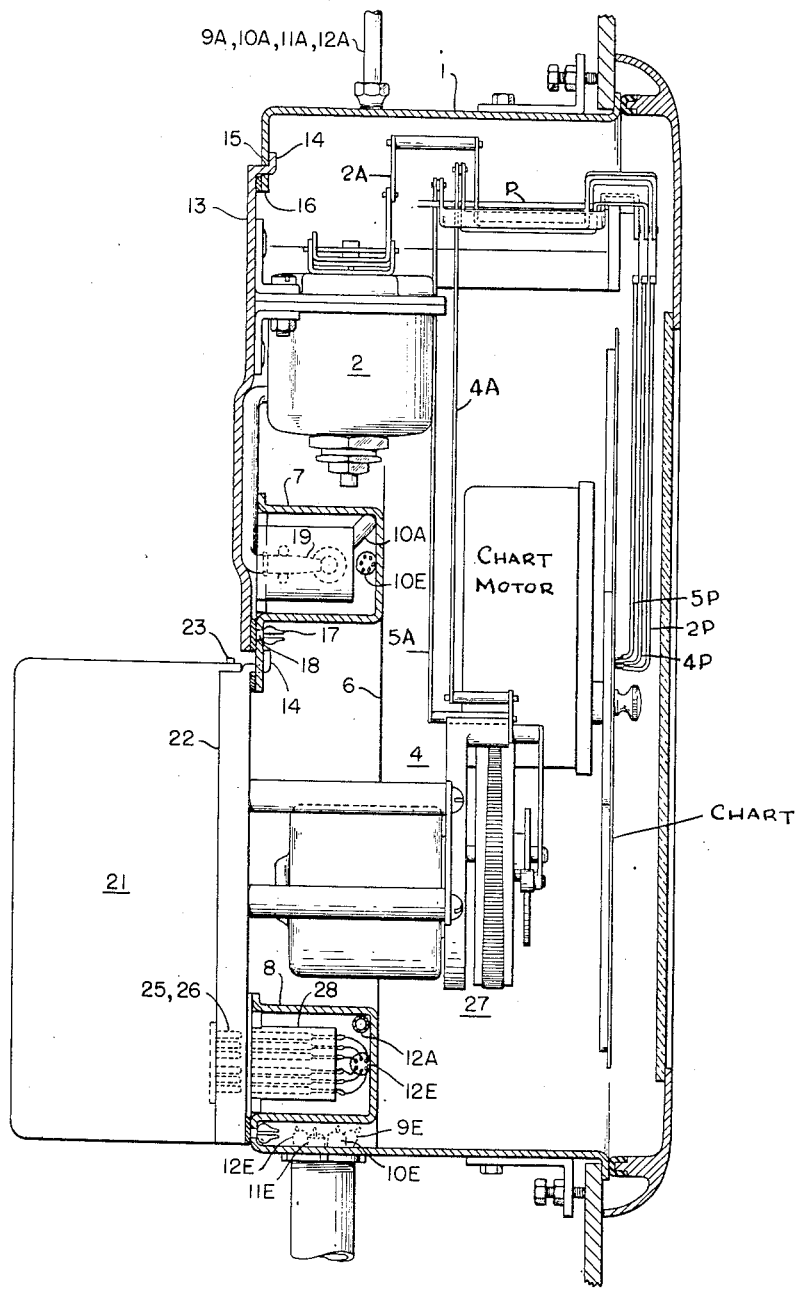
Fig. 2 shows a side elevation of the invention, sectioned to illustrate details of how the units are positioned operatively thereon.

Fig. 2 shows the novel case from a side elevation, partially sectioned through a fluid pressure unit and an electrical unit, in order to delineate details of how the units are positioned at their stations so they can engage their fluid pressure plugs or electrical terminal bodies in the channels 7 and 8. Several details which depict the invention are shown to advantage in Fig. 2. The manner in which the units may be detachably secured to the case station is depicted in some detail, and the uniform relation of the different types of units to the pen linkage is illustrated to some extent.

The uniform relation of the different types of units to the pen linkage is based on the fact that each of units 2, 4 and 5 have a lever which is pivoted through a common angle of initial movement. With links 2A, 4A and 5A actuating crank arms about a common pivotal point P, there is formed actuating linkage which may be moved by any selected unit of 2, 4 or 5 because of this uniform, or common, angle of movement each of these units has.

Fig. 2 is particularly well arranged to illustrate the relation of the actuating linkage 2A, 4A and 5A with their respective recording pens 2P, 4P and 5P which are moved thereby over the chart which has been given a legend. This chart is turned by the motor, legended on the same drawing, with respect to time in order to record the value of the variables to which 2, 4 and 5 are responsive.

Fig. 3 shows the case 1 from its rear, and in elevation, in order to illustrate with maximum clarity the structure mounted in channels 6, 7 and 8. For maximum clarity of illustration the electric cables and fluid pressure pipes are shown simultaneously arranged in the channels. Also, electrical terminal blocks are shown in a somewhat generalized manner. Actually the electrical cables 9E–12E may be taken directly to their terminal bodies at the case stations without going through the blocks. The ultimate desideratum in arrangement is that any of the connections, electrical or fluid pressure, will be deleted if any particular one is not needed at any particular station. Fig. 3 specifically illustrates the maximum availability to every case station of both electrical and fluid pressure connections carrying signals representative of variables. As a practical matter, and to gain the specific objects of the invention, it probably will be desirable to provide each case station with the minimum number of connections needed to actuate the indicator and/or the recorder carried at that station.

Figure 4:
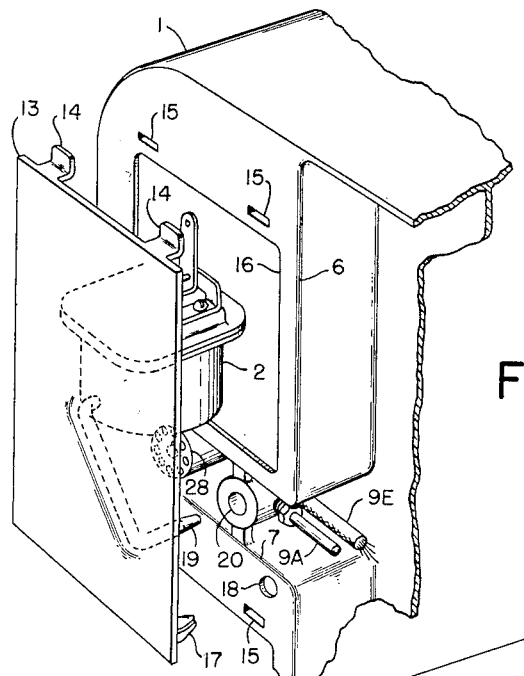
Fig. 4 is an exploded perspective view of a fluid pressure actuated unit and an accommodating station on the case.
Figure 5:
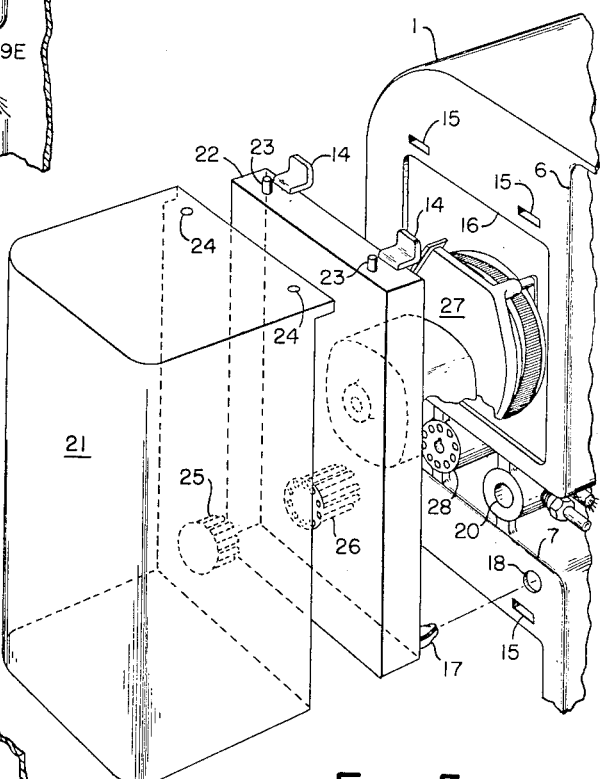
Fig. 5 is an exploded perspective view of an electrically actuated unit and an accommodating station on the case.
Figure 6:
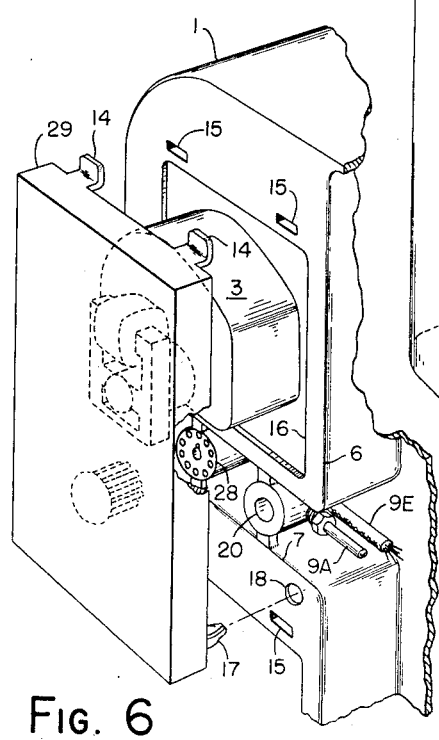
Fig. 6 is an exploded perspective view of an integrating mechanism and an accommodating station on the case.

Considering, specifically, the various types of responsive units contemplated positioning at the various case stations, Figs. 4, 5 and 6 are offered to illustrate with maximum clarity the structure retaining the unit detachably secured in, and to, its station. The various types of units, and their components, are shown in removed, or "exploded," positions without respect to their case stations to show the common denominators of structure which achieve the interchangeable objects of the invention.

In Fig. 4 the fluid pressure responsive unit 2 is shown at its case station. This particular unit is essentially a housed bellows receiving the variable fluid pressures. The more pertinent structure centers about plate 13 as it forms the base for the bellows housing and the fluid pressure connection cooperative with the plug of the conduit. One form of structure for attaching plate 13 into station position is shown in tabs 14 which are projections formed to enter slots 15 above the station aperture 16. After insertion of tabs 14 into slots 15, the attached plate 13 may be pivoted until it is flush with the case back; as the bellows housing on plate 13 is inserted through aperture 16, male snap 17 on plate 13 engages female snap hole 18 on the case back and fluid pressure male plug 19 of the bellows engages fluid pressure female plug 20. With the above structural cooperation completed, unit 2 is placed in operation, at its station, and when connected to indicating and/or recording means by linkage the invention completes one of its specific objects.

Fundamentally, the electrical responsive unit 4 is positioned on the same or another, back station with the structure disclosed in Fig. 4. However, Fig. 5 and Fig. 6 show variations in the support plate structure needed to conform with the characteristics of various types of units.

The amplifier 21 can be supported on plate 22 with posts 23 engaging holes 24 in the amplifier casing. Positive locking between plate and amplifier may be assured through the engagement of male plug 25 on amplifier 21 with female body 26 in plate 22. With posts, holes and plug, an assembly is created which is manually broken down for replacement or maintenance. The motor-potentiometer unit 27 of unit 4 may be carried on plate 22 in a more permanent manner than the amplifier 21, as the removal of the plate from the station provides easy replacement and maintenance of these portions of the unit assembly.

In Figs. 5 and 6 there is illustrated how, with all of the individual variations allowed and provided for, there can remain a common denominator of structural support and access which gives the flexibility of choice among the types of actuated units available for the various stations in the case 1. Tabs 14, slots 15, apertures 16, and snaps 17 and 18 are common while body 26 may cooperate with its mating body 28 on cable 11E while providing for alternate cooperation, between male plug 19 and female plug 20, adequate space is provided in channel 7, under aperture 16, for both, or either of, plug 20 or/and body 28.

In Fig. 6, specifically, an integrating unit 3 is disclosed as one of the candidate units for positioning at a case station. The particular type of integrator shown here was essentially disclosed and claimed in the patent to Gorrie 1,892,183. This unit is distinctive from the standpoint that it may utilize both the fluid pressure plug 20 and the electrical body 28 simultaneously. On the other hand, as disclosed in Fig. 6, the integrator must be positioned by linkage coming to it externally. That is, a separate unit, responsive to the variable to be integrated, in turn positions the integrator linkage.

Either of the units of Figs. 4 and 5 may be linked to the integrator, but it is a relatively simple matter to provide a responsive unit on plate 29 as an integral positioning unit. This contemplated arrangement involves merely designing a responsive unit, such as the fluid pressure responsive unit 2 directly on plate 29 of the integrator. Thus, a variable, entirely separate and distinct from any variable considered at any other station, may be brought into the case, and integrated at any station.

Probably the mounting plate for the integrator becomes the simplest form of all because it merely functions to support the integrator body in position and cooperates the simple electrical connections necessary for motor power. Of course, with the integral responsive unit mounted on the plate, the provision of a fluid pressure plug becomes necessary. In this situation the female body and plug provision shown at the station in Fig. 3 may well be that required for an integral-actuated integrator.

Figure 7:
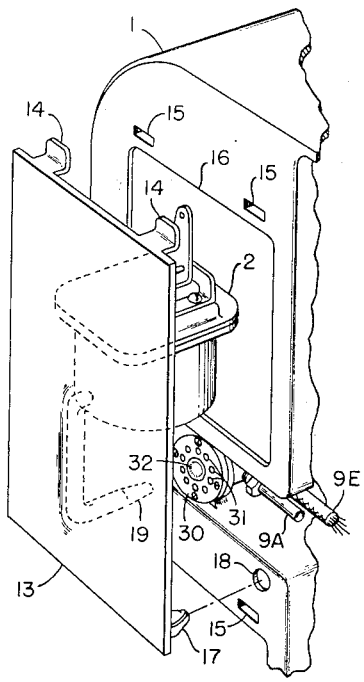
Fig. 7 is an exploded perspective view of a composite plug-terminal female connector on the invention cooperating with a fluid pressure unit.
Figure 8:
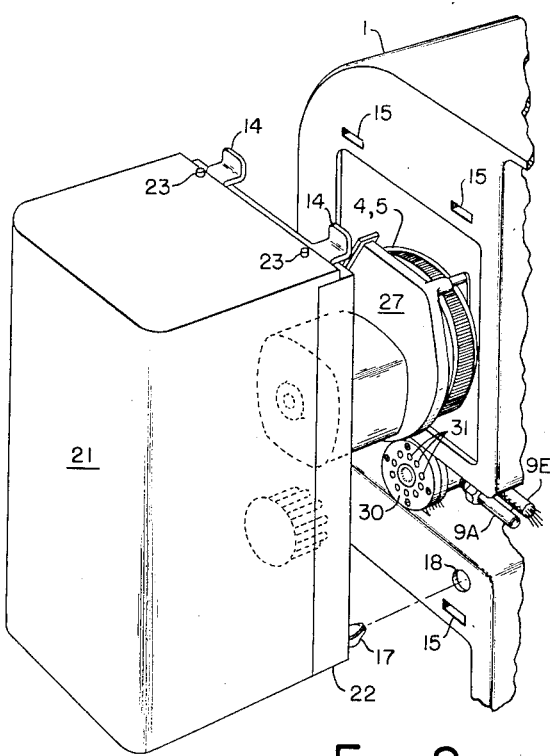
Fig. 8 is an exploded perspective view of the composite plug-terminal female connector on the invention cooperating with an electrical unit.
Figure 9:
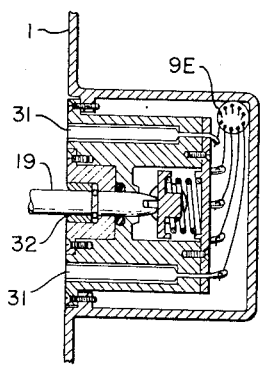
Fig. 9 is a section thru one form of the composite connector.

There is next considered a possible alternate arrangement wherein the electric female terminal body 28 and fluid pressure female plug 20 may be combined into a composite female member for the plural purposes at any of the unit stations in the novel case. Fig. 7 is presented to show this composite body member 30 as positioned in one of the channels 7 or 8 of the case back so that it may be engaged with the male plug of the fluid pressure unit 2. Fig. 8 is presented to show the same composite member 30 positioned in the channel 7 or 8 so that it may be engaged with the male terminal body of an electric unit. Thus is illustrated how this composite member 30 may be uniformly engaged by either an electric or fluid pressure unit detachably secured to the station at that position. The female electrical connections 31 are disposed around a circle in the cross section of the composite member in essentially the manner found in the female terminal body 28. Concentric within the circle of connections 31 is located fluid pressure female connection 32 quite similar to that in fluid pressure female plug 20.

A small problem arises in arranging the fluid pressure structure necessary to seal off the fluid pressure connection upon removal of the units such as unit 2. Cross sectional view 9 outlines one form of structure which can accomplish this seal-off if this function is necessary. It is conceivable that this arrangement may involve a slight enlargement of the circle of the female electrical connections 31 longitudinally arranged within the composite female member beyond what is normally found in electrical terminal bodies such as 28. However this problem is merely one of design.

Figure 10:
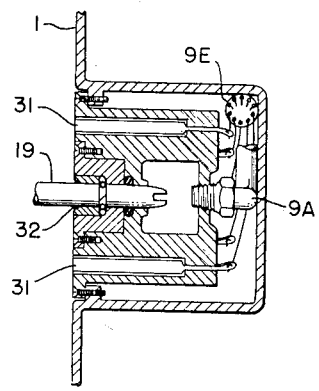
Fig. 10 is a section thru another form of the composite connector.

It is a fact that in many instances it will be unnecessary to provide for any seal-off arrangement for the fluid pressure conduits coming from the point of measurement into the case. In this eventuality of straight-through fluid pressure connection is feasible with relatively little, or no, enlargement of the circle of female connections over what is conventionally found in this type of electrical terminal bodies. Fig. 10 illustrates one simple form of this type of fluid pressure terminus in the composite female number. If the waste of fluid pressure is not important and the disruption of the system causes no impairment of control function, this arrangement of Fig. 10 may well be a more economical embodiment of this unique, composite, female member. However, in whatever form it is embodied, this composite female member forms a universal terminal connection for the various types of conduits which will accommodate any of the various types of male plugs of the units selected.

While the drawing, and description thereof, shows the female portion of the fluid pressure connection and of the electrical connection, fastened to the case, while the male portion is carried by the detachable unit, it will be understood that the reverse may be done for either the fluid pressure or the electrical or both.

Although I have selected a particular embodiment for my invention as a basis of adequate disclosure, it can be easily appreciated that many variations of these embodiments are possible without departing from the scope of my invention as set forth in the appended claims.

What I claim as new and desire to secure by Letters Patent of the United States, is:

1. A receiving case for a plurality of instruments responsive to variables including, removable female terminal bodies attached to the case for electrical and fluid pressure conduits which convey signals representative of the variables, channels formed into the back wall of the case and communicating with the terminal bodies, electrical and fluid pressure conduits detachably retained in the channels and communicating with the terminal bodies, a plurality of stations outlined on the case back by apertures and fastening means for accommodation of electrical and fluid pressure receiving instruments, electrical and fluid pressure receiving instruments, and electrical and fluid pressure male terminals on matching instruments positionally oriented to cooperate with the female terminal bodies at the stations.

2. An instrument assembly and case combination including; a supporting and enclosing case enclosure including; a vertical channel structure formed in the rear case wall for receiving conduits, holding structure for electrical and fluid pressure conduits in the vertical channel, two horizontal channel structures intercepting the vertical channel at right angles and lying beneath apertures through the rear case wall, manually controlled fasteners at each aperture for securing electrical and fluid pressure actuated receivers therein, and retaining structure on the horizontal channels for the terminal bodies and plugs of electrical and fluid pressure conduits which extend into the horizontal channels from the vertical channels; and electrical and fluid pressure actuated instruments detachably retained in the case back apertures including; electrical bodies and fluid pressure plugs arranged to complete connections with the bodies and plugs of the channels, actuating arms moved through a substantially common angle, and actuated linkage for each instrument which is moved by the actuating arms.

3. An instrument case for four or less indicating instruments including; a back plate structure with three channels formed into its outside face, one channel centrally extended along a first lateral dimension, and the other two channels intersecting the first channel at right angles in their extension along the length of a second horizontal dimension; a station adjacent each of the four portions of the latter two channels characterized by an aperture in the back plate and fastening means for removably securing either an electrical or fluid pressure actuated indicating instrument; means for detachably securing electrical harness and terminal bodies within the channels adjacent to each station; and means for detachably securing fluid pressure conduit and terminal plugs within the channels adjacent to each station.

4. The instrument case of claim 3 in combination with an instrument assembly including; electrical and fluid pressure actuated instruments detachably held in the case back apertures including, electrical bodies and fluid pressure plugs arranged to complete connections with the bodies and plugs of the harness and conduits, actuating arms moved through a substantially common angle, and actuated linkage for each instrument moved by the actuating arms.

5. A recording instrument for receiving electrical or fluid pressure telemetered signals representative of measured variables such as fluid flow, pressure, speed and the like, for recording the same, including in combination; a rearwardly extending casing having top, bottom, two sides, and a rear, walls; the rear wall provided with at least one instrument station consisting of a cut-out shaped to permit entry therethrough from the rear of a signal receiving instrument, and a plurality of locating and detachably retaining provisions adjacent the cut-out and cooperating with the signal receiving instrument when the latter is inserted forwardly through the cut-out; a time motor forwardly mounted on the front of the rear wall; a recording chart mounted to be revoluble by the time motor; pivoted recording pen means arranged to cooperate with the chart; linkage in driving connection with the pen means and adapted to be positioned by the signal receiving instrument when the latter is inserted through said rear wall station; one portion of a separable plug-in electrical connecting unit fixed to the back of the rear wall adjacent the station and arranged for connection to a remote signal transmitter; one portion of a separable plug-in fluid pressure connecting unit fixed to the back of the said rear wall adjacent the station and arranged for connection to a remote signal transmitter; and a signal receiving instrument mounted on a support having provisions for detachably cooperating with the plurality of locating retaining provisions of said rear wall when the instrument is forwardly inserted through said cut-out, and a mating portion of a separable plug-in connecting unit carried by the instrument support cooperable with one of the plug-in portions fixed to the rear wall to the end that when the instrument is forwardly inserted through said cut-out it is simultaneously receivably connected to a remote signal transmitter.

6. The combination of claim 5 wherein the signal receiving instrument is responsive to telemetered electrical signals.

7. The combination of claim 5 wherein the signal receiving instrument is responsive to telemetered fluid pressure signals.

8. An article of manufacture which includes, a casing with a back wall having a plurality of stations having apertures, channels recessed into the back wall adjacent the apertures, provisions in the channels for detachably securing electric and fluid pressure terminals in fixed proximity to the apertures, provisions for detachably retaining electric and fluid pressure conduits in the channels and to the terminals, a plurality of responsive instruments with connections and terminals arranged to complete union with matching terminals at each aperture as the instruments are alternately and detachably secured in the apertures, an actuating arm for each instrument moved through a substantially common angle, and actuated linkage for each instrument with a common pivotal point and which is moved by the actuating arm of each instrument.

9. An instrument-case combination including, provisions in the back wall of the case for inserting an instrument throuh the back wall of the case, provisions mounted on the case for detachably securing electric and fluid pressure terminals to the back wall of the case, provisions mounted on the back wall of the case for detachably securing electric and fluid pressure conduits to the case and terminals on the back wall of the case, provisions mounted on the back wall of the case for detachably securing electric and fluid pressure responsive instruments selectively through the back wall of the case and simultaneously to a matching one of the terminals, and means mounted in the case for exhibiting the response of the instrument to the magnitudes of signals from the matching terminal and associated conduit.

References Cited in the file of this patent

UNITED STATES PATENTS

| Number | Name | Date |
| --- | --- | --- |
| 479,139 | Miller | July 19, 1892 |
| 931,566 | Cholet | Aug. 17, 1909 |
| 1,048,900 | Sheppy et al. | Dec. 31, 1912 |
| 1,937,681 | Blackman | Dec. 5, 1933 |
| 2,186,517 | Bradford | Jan. 9, 1940 |
| 2,423,597 | Hurn | July 8, 1947 |
| 2,495,531 | Lederer | Jan. 24, 1950 |
| 2,510,125 | Meakin | June 6, 1950 |
| 2,538,489 | Walton | Jan. 16, 1951 |
| 2,587,079 | Woods et al. | Feb. 26, 1952 |
| 2,631,185 | Earle et al. | Mar. 10, 1953 |